(12) United States Patent
Nagao et al.

(10) Patent No.: US 12,151,533 B2
(45) Date of Patent: Nov. 26, 2024

(54) CYLINDER DEVICE

(71) Applicant: Hitachi Astemo, Ltd., Hitachinaka (JP)

(72) Inventors: Riichi Nagao, Tokyo (JP); Koichi Yamaka, Hitachinaka (JP); Yoshihiro Yamaguchi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 418 days.

(21) Appl. No.: 17/424,961

(22) PCT Filed: Feb. 14, 2020

(86) PCT No.: PCT/JP2020/005740
§ 371 (c)(1),
(2) Date: Jul. 22, 2021

(87) PCT Pub. No.: WO2020/184058
PCT Pub. Date: Sep. 17, 2020

(65) Prior Publication Data
US 2022/0088983 A1 Mar. 24, 2022

(30) Foreign Application Priority Data
Mar. 8, 2019 (JP) .................. 2019-042473

(51) Int. Cl.
*F16F 9/32* (2006.01)
*B60G 3/28* (2006.01)
*F16F 9/54* (2006.01)

(52) U.S. Cl.
CPC .............. *B60G 3/28* (2013.01); *F16F 9/3235* (2013.01); *F16F 9/54* (2013.01)

(58) Field of Classification Search
CPC ....... B60G 3/28; F16F 9/34; F16F 9/36; F16F 9/44; F16F 9/46; F16F 9/54; F16F 9/3235
(Continued)

(56) References Cited

U.S. PATENT DOCUMENTS 2,710,077 A * 6/1955 Fabel .................... F16F 9/3235
188/320
3,424,448 A * 1/1969 Chak Ma ................ F16F 13/06
188/288
(Continued)

FOREIGN PATENT DOCUMENTS

JP  H03-292427 A  12/1991
JP  2001-182772 A  7/2001
(Continued)

OTHER PUBLICATIONS

Office Action issued in corresponding Korean Application No. 10-2021-7024651 dated Dec. 17, 2022 with English Machine Translation (16 pages).
(Continued)

*Primary Examiner* — Christopher P Schwartz
(74) *Attorney, Agent, or Firm* — Foley & Lardner LLP

(57) ABSTRACT

The present invention provides a shock absorber serving as a cylinder device capable of securing a clearance between an outer tube and a peripheral member and improving bending rigidity of the outer tube. An outer tube 104 housing an inner tube 103 is provided with a pair of knuckle bracket fastening plates 110a and 110b protruding in one direction from an outer surface of the outer tube 104. The pair of knuckle bracket fastening plates 10a and 110b has wide surfaces facing each other, and the wide surfaces are provided along an axial direction of the outer tube 104. When the inside of a vehicle is defined as a virtual region I 192 and the outside of the vehicle is defined as a virtual region II 193 with a virtual line 191, which passes through a stroke center line 71 and matches the inside and outside of the vehicle, as a boundary in an orthogonal cross section at an arbitrary axial position of the outer tube 104 orthogonal to the stroke center line 71 of a piston rod 102, a cross-sectional area $A_{i1}$ of the
(Continued)

outer tube 104 in the virtual region I 192 is made larger than a cross-sectional area $A_{o1}$ of the outer tube 104 in the virtual region II 193.

16 Claims, 11 Drawing Sheets

(58) Field of Classification Search
USPC .............................. 188/322.19, 320, 321.11
See application file for complete search history.

(56) References Cited

U.S. PATENT DOCUMENTS

| | | | | |
|---|---|---|---|---|
| 4,306,638 | A * | 12/1981 | Malott | F16F 9/38 |
| | | | | 188/315 |
| 6,881,004 | B2 * | 4/2005 | Handke | B60G 15/07 |
| | | | | 280/124.1 |
| 6,981,798 | B2 * | 1/2006 | Katagiri | F16C 9/04 |
| | | | | 384/294 |
| 10,385,918 | B1 * | 8/2019 | Germano | F16C 9/04 |
| 10,836,230 | B2 * | 11/2020 | Hintzen | B60G 3/06 |
| 2003/0168296 | A1 * | 9/2003 | Fullenkamp | B60G 15/063 |
| | | | | 188/322.19 |
| 2007/0221459 | A1 * | 9/2007 | Kobelev | F16F 9/3235 |
| | | | | 188/322.19 |
| 2007/0267260 | A1 * | 11/2007 | Sakashita | B60G 13/005 |
| | | | | 188/322.19 |
| 2021/0380193 | A1 * | 12/2021 | Kimura | F16F 9/364 |
| 2022/0112933 | A1 * | 4/2022 | Yamaka | B60G 13/005 |
| 2022/0213943 | A1 * | 7/2022 | Kurihara | B60G 15/063 |

FOREIGN PATENT DOCUMENTS

| | | | |
|---|---|---|---|
| JP | 2002-089606 A | 3/2002 | |
| JP | 3695726 B2 * | 9/2005 | ............... F16F 9/38 |
| JP | 2010-069962 A | 4/2010 | |

OTHER PUBLICATIONS

International Search Report with English translation and Written Opinion issued in corresponding application No. PCT/JP2020/005740 dated Apr. 14, 2020.

* cited by examiner

CYLINDER DEVICE

TECHNICAL FIELD

The present invention relates to a strut shock absorber and a shock absorber serving as a cylinder device used for an automobile or the like.

BACKGROUND ART

In a shock absorber serving as a cylinder device used for a suspension of an automobile, particularly a McPherson strut suspension, a piston including a damping valve is housed in an inner tube and slides inside the inner tube along an axial direction. An outer tube forming a reservoir chamber is arranged on an outer peripheral side of the inner tube. Recent shock absorbers are mainly of a dual tube type including an inner tube and an outer tube. Upper ends and bottom ends of the inner tube and the outer tube are coupled by a rod guide and a bottom valve, respectively. A piston rod is housed in the inner tube and the outer tube, and a piston is fixed to a bottom end side of the piston rod. An upper end side of the piston rod penetrates the rod guide and protrudes from the outer tube. A strut shock absorber, which is a kind of the dual tube type shock absorber, supports a dead weight of a vehicle body and a vehicle body posture against an inclination due to inertia of the vehicle body, as a vehicle pillar, and attenuates vibrations during traveling.

When the dual-tube-type strut shock absorber is used in the McPherson strut suspension, the upper end of the piston rod is mainly coupled to the vehicle body. The bottom end side of the outer tube is coupled to a knuckle serving as a wheel support member via a knuckle bracket. The knuckle bracket is coupled so as to sandwich the wheel support member with plate portions each having a width across flats and extending outward from the vehicle body. As a result, the dual-tube-type strut shock absorber supports the dead weight of the vehicle body. The dual-tube-type strut shock absorber supports a resultant force (lateral force) of a load parallel to the longitudinal direction of the vehicle body and a load parallel to inward and outward directions of the vehicle body generated when a vehicle body posture changes due to inertia or the like during traveling.

Since the dual-tube-type strut shock absorber has a function as the vehicle pillar, it is desired to improve bending rigidity against the lateral force in order to improve steering stability and ride comfort. By improving the bending rigidity, the dual-tube-type strut shock absorber can reduce the entire elastic deformation amount, and can improve the steering stability by reducing the roll amount of the vehicle body. Further, by reducing the elastic deformation amount, friction between the piston and the inner tube serving as a cylinder can be reduced, and smooth linear sliding of the piston can be realized to improve the ride comfort.

In order to improve the bending rigidity, it is particularly effective to improve the second moment of area by enlarging an outer shape of the outer tube. For example, a technique described in PTL 1 is proposed to improve the second moment of area. In PTL 1, an outer tube is formed in an elliptical shape, and the thickness of the outer tube is increased at a portion of a center line in the same direction as an axle to improve the second moment of area and secure the bending rigidity.

CITATION LIST

Patent Literature

PTL 1: JP 2002-89606 A

SUMMARY OF INVENTION

Technical Problem

When the strut shock absorber is attached to the vehicle body, it is necessary to avoid interference with a peripheral component. In particular, it is necessary to consider a response at the time of mounting a tire chain or at the time of wheel inching-up between a wheel rim and the outer tube. That is, even when the tire chain is mounted or when the wheel is inched up, it is necessary to secure a sufficient clearance between the wheel rim, the tire, and the outer tube such that the outer tube does not come into contact with the tire chain or the inched-up wheel.

In the technique described in PTL 1, predetermined bending rigidity can be secured, but the interference between the strut shock absorber and the peripheral component is not taken into consideration, so that there is a possibility that these components and the outer tube interfere with each other when the tire chain is mounted or when the wheel is inched up.

Further, in the technique described in PTL 1, the outer tube is arranged so as to have a large wall thickness between the inside and the outside of the vehicle. In consideration of mounting the strut shock absorber on a plurality of vehicle types in order to share components, for example, the thickness on the inside of a vehicle is limited by one vehicle type, and at the same time, the thickness on the outside of the vehicle is also limited. For this reason, there is a possibility that it is difficult to sufficiently secure the bending rigidity of the strut shock absorber in the other vehicle types.

An object of the present invention is to solve the above problems, and to provide a cylinder device capable of securing a clearance between an outer tube and a peripheral member and improving bending rigidity of the outer tube.

Solution to Problem

In order to achieve the above object, according to the present invention provides a cylinder device including: a piston; a buffer mechanism having a piston rod connected to the piston; a tubular inner tube housing the buffer mechanism; and an outer tube housing the inner tube. The outer tube has a pair of knuckle attachment portions provided integrally with the outer tube and protruding toward one direction from an outer surface of the outer tube. The pair of knuckle attachment portions have wide surfaces facing each other, the wide surfaces being provided along an axial direction of the outer tube. When the inside of a vehicle is defined as a virtual region I and the outside of the vehicle is defined as a virtual region II with a virtual line, which passes through a stroke center line and matches the inside and the outside of the vehicle, as a boundary in an orthogonal cross section at an arbitrary axial position of the outer tube orthogonal to the stroke center line of the piston rod, a cross-sectional area of the outer tube in the virtual region I is made larger than a cross-sectional area of the outer tube in the virtual region II.

Advantageous Effects of Invention

According to the present invention, it is possible to provide the cylinder device capable of securing the clearance between the outer tube and the peripheral member and improving the bending rigidity of the outer tube.

DESCRIPTION OF EMBODIMENTS

Hereinafter, embodiments of a cylinder device according to the present invention will be described with reference to the drawings. The present invention is not limited to the following embodiments, but includes various modifications and application examples within a technical concept of the present invention.

In each embodiment of the present invention, a case where the present invention is applied to a four-wheeled automobile will be described as an example. Further, an example in which a dual-tube-type strut shock absorber is used as a shock absorber serving as a cylinder device will be described in each embodiment of the present invention. In the description of each embodiment, an X direction, a Y direction, and a Z direction are defined according to coordinate axes illustrated in each drawing, a direction of an arrow is expressed as positive (+), and a direction of an opposite arrow is expressed as negative (−).

First Embodiment

Figure 1:
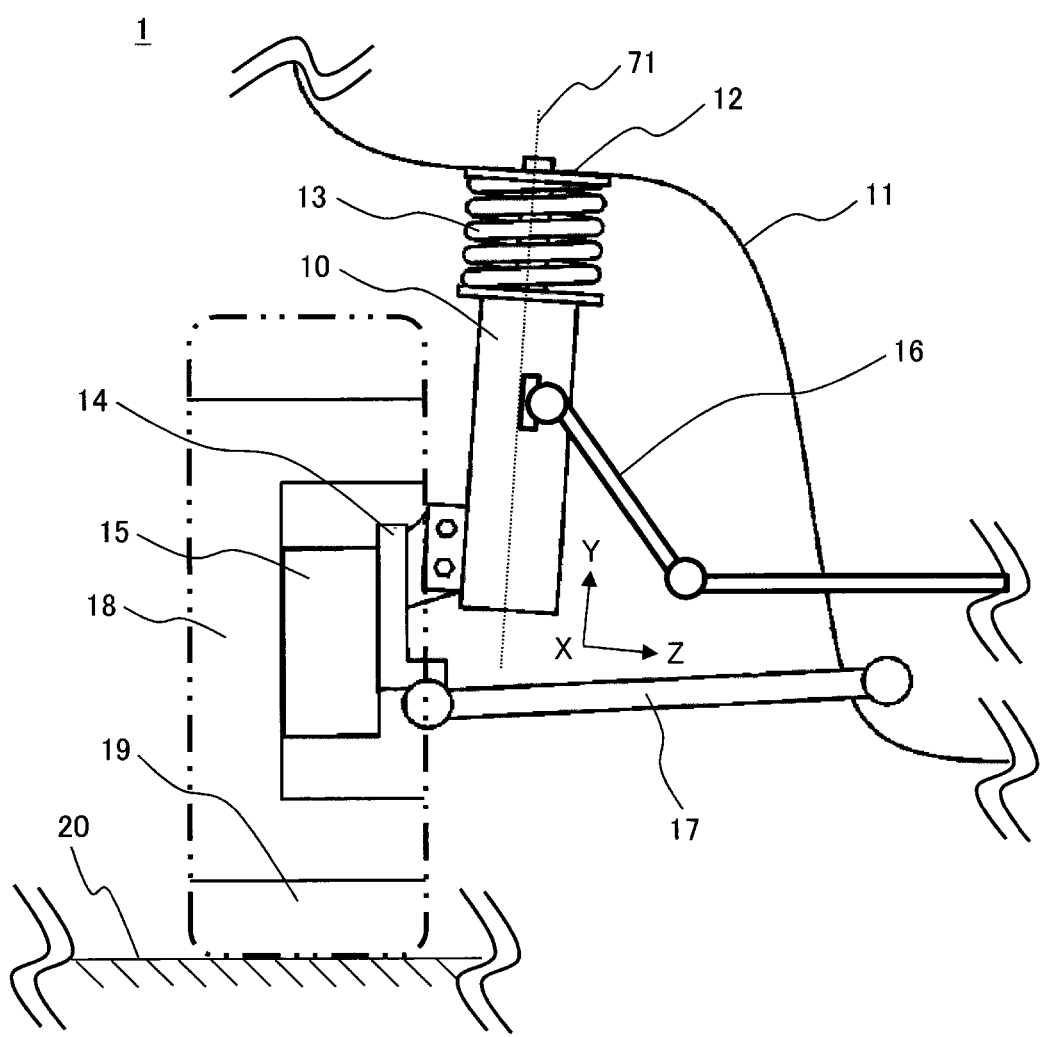
FIG. 1 is a schematic diagram of a suspension device according to a first embodiment of the present invention.

FIG. 1 is a schematic diagram of a suspension device according to a first embodiment of the present invention. FIG. 1 is a view of a vehicle as viewed from the front, and illustrates a front wheel (one wheel) located on the right side in a progressing direction of the vehicle.

A McPherson strut suspension device 1 for an automobile includes: a strut 10 that connects a vehicle body 11 and a tire 19 as a vehicle pillar; a coil spring 13 that is suspended by the strut 10 and generates a vehicle weight and a damping resistance; a stabilizer 16 that is fastened to the strut 10 and compensates rigidity against torsion of the vehicle body at the time of curving to maintain a vehicle body posture; a knuckle 14 that fastens the strut 10; and a lower arm 17 that is a structural member which is fastened to the knuckle 14 and determines a camber angle and a caster angle. The struts 10 generate a damping force and support a lateral force.

One end side of the McPherson strut suspension device 1 for the automobile is coupled to the vehicle body 11 via an upper mount 12 fixed to the +Y side of the strut 10 and the coil spring 13. Further, the other end side of the McPherson strut suspension device 1 for the automobile is connected to one end side of the lower arm 17 and is coupled to the vehicle body 11.

A bearing (not illustrated) is fixed to the knuckle 14, and the bearing rotatably supports a wheel hub 15. A wheel rim 18 is fixed to the wheel hub 15, and the tire 19 is fixed to an outer peripheral portion of the wheel rim 18. The wheel rim 18 and the tire 19 form a wheel. The tire 19 is grounded to a ground 20, and transmits a driving force to the ground 20 to cause the vehicle to travel. The lateral force acting during traveling is mainly supported by the strut 10 and the knuckle 14, and suppresses displacement of the vehicle body. Vibrations due to an input from the ground 20 or an input from the vehicle body 11 are attenuated as the strut 10 and the coil spring 13 linearly move along a stroke center line 71.

Figure 2:
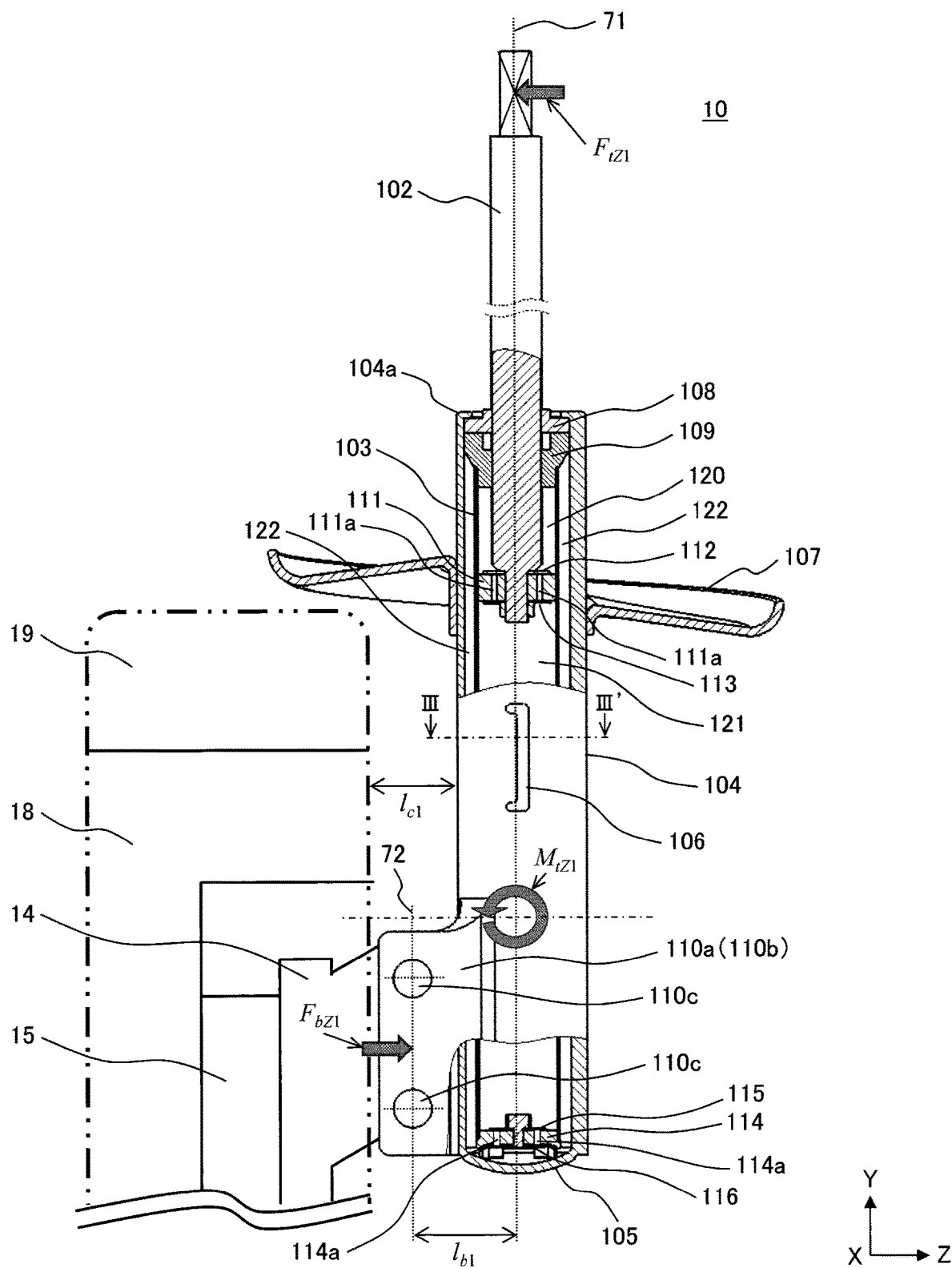
FIG. 2 is a longitudinal side view of a dual-tube-type strut shock absorber as viewed from a front direction of a vehicle body according to the first embodiment of the present invention.
Figure 3:
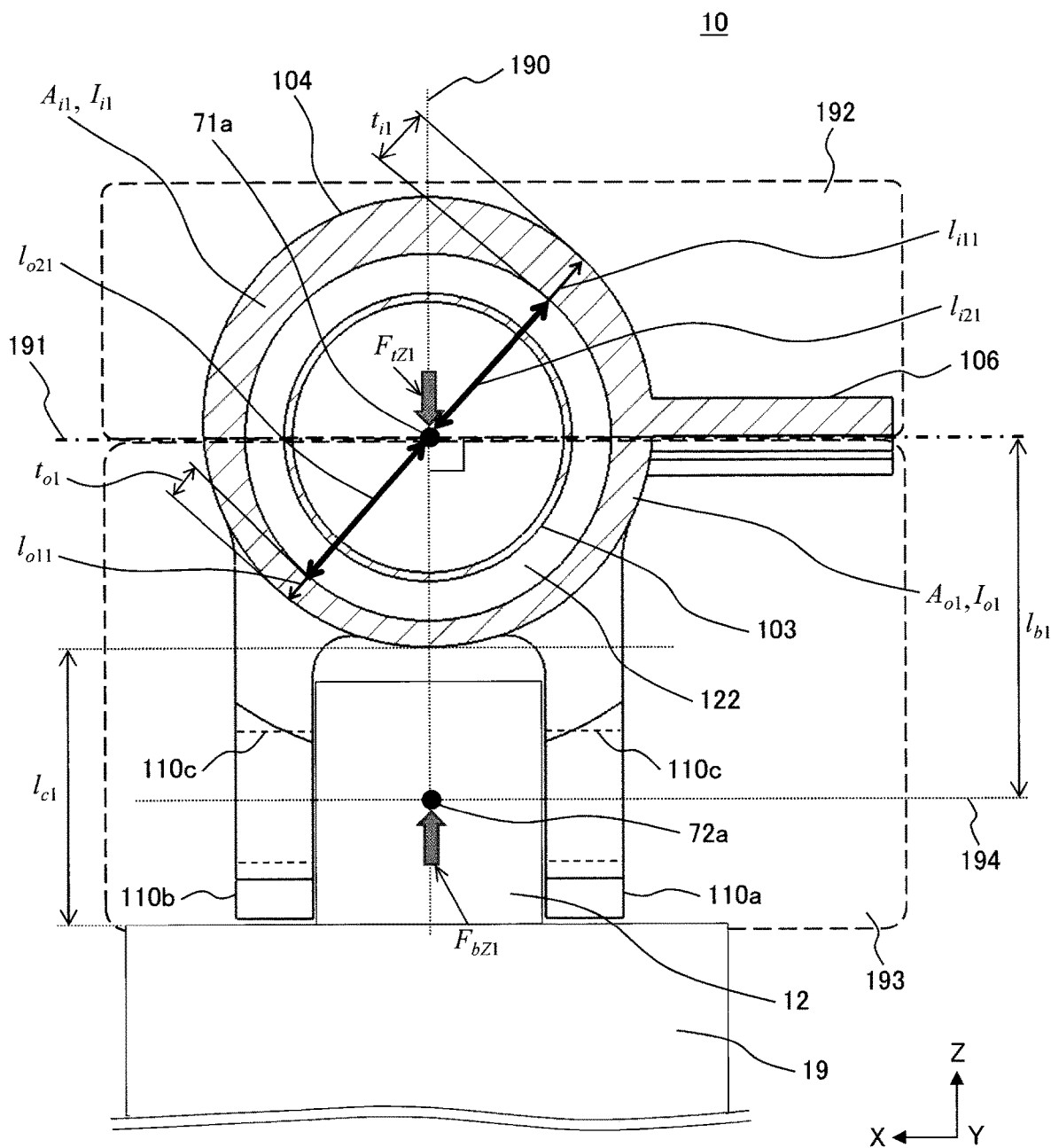
FIG. 3 is a cross-sectional view taken along line III-III' of FIG. 2.

FIG. 2 is a longitudinal side view of the dual-tube-type strut shock absorber as viewed from a front direction of the vehicle body according to the first embodiment of the present invention, and FIG. 3 is a cross-sectional view taken along line III-III' of FIG. 2. The strut 10 includes an inner tube 103 that slidably houses a piston 111 and an outer tube 104 arranged on an outer peripheral side of the inner tube 103. The outer tube 104 is made of a gravity casting, and houses the inner tube 103 therein. The inner tube 103 and the outer tube 104 are concentrically arranged about a stroke center line 71 which is a sliding axis of the piston 111. A reservoir chamber 122 is formed between the inner tube 103 and the outer tube 104. A piston rod 102 is connected to the piston 111 to form a buffer mechanism. The buffer mechanism is housed in the tubular inner tube 103.

An oil seal 108 and a rod guide 109 are provided at distal ends of the inner tube 103 and the outer tube 104 in the +Y direction. The distal end side of the outer tube 104 is molded to have an axial length longer than an axial length of the inner tube 103, and the oil seal 108 and the rod guide 109 are stored in this portion. The rod guide 109 is press-fitted and fixed to the distal end of the inner tube 103 in the +Y direction. An integrated outer tube bottom plate 105 is molded at a bottom end in the Y-axis direction. Similarly to the distal end side, the bottom end side of the outer tube 104 has an axial length longer than an axial length of the inner tube 103. A bottom valve 114 is stored in this portion.

A portion of the outer tube distal end plate 104a on one end side of the outer tube 104 is formed with an opening, and is provided with the oil seal 108, the rod guide 109, the inner tube 103, and the bottom valve 114. The oil seal 108, the rod guide 109, the inner tube 103, and the bottom valve 114 are caulked and fixed by the outer tube distal end plate 104a integrated with the distal end of the outer tube 104 in the +Y direction, and a compressive residual axial force transmitted in the order of the oil seal 108, the rod guide 109, the inner tube 103, the bottom valve 114, and the outer tube bottom plate 105 is applied. At this time, the inner tube 103 is filled with a liquid (not illustrated) such as oil, and a predetermined amount of nitrogen gas (not illustrated) is sealed in the reservoir chamber 122 together with the liquid. The oil and the nitrogen gas are sealed with the caulked and fixed oil seal 108. Further, an opening center on one end side of the outer tube 104 is coaxial with the stroke center line 71 of the piston rod 102. As a result, the assemblability between the outer tube 104 and the piston rod 102 can be improved.

The piston 111 is coupled to a bottom end of the piston rod 102 in the +Y direction. A distal end of the piston rod 102 penetrates the oil seal 108 and the rod guide 109, extends to the distal end of the outer tube 104 in the +Y direction, and is coupled to the vehicle body 11 via the upper mount 12 illustrated in FIG. 1.

An outer peripheral surface of the outer tube 104 is provided with: a stabilizer bracket 106 which is integrally molded with the outer peripheral surface and fastens the stabilizer 16; a spring seat 107 fixed to the outer peripheral surface and supporting the coil spring 13; and knuckle bracket fastening plates 110*a* and 110*b* (knuckle attachment portions) which are integrally molded with the outer peripheral surface and fasten the knuckle. The knuckle bracket fastening plates 110*a* and 110*b* at both ends in the X direction are integrally molded with the outer tube 104 so as to be separated from each other to have a width across flats and extend outward of the vehicle body in the −Z direction, and are fastened and fixed with the knuckle 14 by a bolt passing through bolt fastening holes 110*c*. In other words, the pair of knuckle bracket fastening plates 110*a* and 110*b* protrude in one direction from the outer surface of the outer tube 104 and have wide surfaces facing each other. The wide surfaces are provided along the axial direction of the outer tube 104. As a result, the knuckle 14 is connected to the vehicle body 11 via the strut 10.

The piston 111 is housed inside the inner tube 103 to partition the inside of the inner tube 103 into an upper chamber 120 and a lower chamber 121. The piston 111 is provided with one or more piston orifices 111*a*, a piston check valve 112, and an extension-side damping valve 113. The piston rod 102 is connected to the piston 111 and enters and exits the inner tube 103. A damping force when the piston rod 102 strokes in an extension direction (+Y direction) along the stroke center line 71 is generated as a flow resistance is loaded by the liquid passing through the piston orifice 111*a* and the extension-side damping valve 113 when flowing into the lower chamber 121 from the upper chamber 120.

When the piston rod 102 strokes in a contraction direction (−Y direction) along the stroke center line 71, the liquid flows from the lower chamber 121 into the upper chamber 120 through the piston orifice 111*a* by the piston check valve 112.

The bottom valve 114 is provided with one or more bottom valve orifices 114*a*, a bottom valve check valve 115, and a contraction-side damping valve 116. When the piston rod 102 strokes in the extension direction (+Y direction) along the stroke center line 71, the liquid flows into the lower chamber 121 from the reservoir chamber 122 through the bottom valve orifice 114*a* by the bottom valve check valve 115.

A damping force when the piston rod 102 strokes in a contraction direction (−Y direction) along the stroke center line 71 is generated as a flow resistance is loaded by the liquid passing through the bottom valve orifice 114*a* and the contraction-side damping valve 116 when flowing into the reservoir chamber 122 from the lower chamber 121.

Therefore, when the piston rod 102 strokes in the extension direction (+Y direction) along the stroke center line 71, the damping force is generated by the piston orifice 111*a* of the piston 111 and the extension-side damping valve 113. At the same time, a liquid as much as withdrawal of the piston rod 102 is replenished from the reservoir chamber 122 into the lower chamber 121 through the bottom valve check valve 115 of the bottom valve 114.

Conversely, when the piston rod 102 strokes in the contraction direction (−Y direction) along the stroke center line 71, the upper chamber 120 and the lower chamber 121 are connected. At the same time, the liquid flows from the lower chamber 121 into the reservoir chamber 122 to generate the damping force by the bottom valve orifice 114*a* of the bottom valve 114 and the contraction-side damping valve 116.

Next, a cross-sectional shape of the strut 10 will be described with reference to FIG. 3. FIG. 3 is a cross-sectional view taken along line III-III' of FIG. 2. A cross section taken along line III-III' is an orthogonal cross section at an arbitrary axial position of the outer tube 104, which is orthogonal to the stroke center line 71 of the piston rod 102.

In the orthogonal cross section of FIG. 3, a point on the stroke center line 71 is defined as a stroke center point 71*a*. A line, which passes through the stroke center point 71*a* (stroke center line 71), matches the inside and the outside of the vehicle, and extends in the Z direction as a boundary between the inside and the outside of the vehicle, is defined as a virtual line 191. The virtual line 191 is a line parallel to a bolt fastening hole central axis 194 passing through the centers of the bolt fastening holes 110*c* formed in the knuckle bracket fastening plates 110*a* and 110*b*. Further, the virtual line 191 is a line orthogonal to a rotation axis of the wheel. A knuckle fastening center point 72*a* is located on the bolt fastening hole central axis 194. When the +Z direction that is the inside of the vehicle is defined as a virtual region I 192 and the −Z direction that is the outside of the vehicle is defined as a virtual region II 193 with the virtual line 191 as a boundary, a cross-sectional area $A_{i1}$ of the outer tube 104 in the virtual region I 192 is larger than a cross-sectional area $A_{o1}$ of the outer tube 104 in the virtual region II 193 (cross-sectional area $A_{i1}$>cross-sectional area $A_{o1}$) in the present embodiment.

In other words, in the orthogonal cross section at the arbitrary axial position on the stroke center line 71 (central axis) of the piston rod 102 (rod) of the outer tube 104, a cross-sectional area of the outer tube 104 is divided into one side in the radial direction and the other side in the radial direction with respect to the stroke center line 71 (central axis), and the cross-sectional area $A_{o1}$ on the one side in the radial direction of the outer tube 104 is made smaller than the cross-sectional area $A_{o1}$ on the other side in the radial direction. At this time, a boundary between the one side in the radial direction and the other side in the radial direction with respect to the stroke center line 71 (central axis) is a surface orthogonal to the rotation axis of the wheel. The maximum distance of a perpendicular line from a boundary surface between the one side in the radial direction and the other side in the radial direction with respect to an outer periphery of the outer tube 104 in the orthogonal cross section at the arbitrary axial position of the stroke center line 71 (central axis) is shorter on the one side in the radial direction.

The cross-sectional area $A_{i1}$ and the cross-sectional area $A_{o1}$ may include a cross-sectional area of the stabilizer bracket 106.

A lateral force parallel to the +Z direction, which is a vehicle body inward direction, and the −Z direction, which is a vehicle outward direction, acts on the distal end of the piston rod 102 in the +Y direction of the strut 10 illustrated in FIG. 2 due to a change of the vehicle body posture caused by steering during traveling of the vehicle.

In FIG. 2, as an example, the lateral force in the vehicle outward direction is indicated as a lateral force $F_{tZ1}$. The magnitude and orientation of the lateral force $F_{tZ1}$ randomly change from time to time depending on a traveling situation. The strut 10 is fastened to the knuckle 14 via the knuckle bracket fastening plates 110a and 110b and serves as a fixing portion with respect to the lateral force $F_{tZ1}$, and a reaction force $F_{bZ1}$ acts on the knuckle bracket fastening plates 110a and 110b and the outer tube 104 in the vicinity. At this time, a knuckle fastening center line 72 where the reaction force $F_{bZ1}$ is generated is not coaxial with the stroke center line 71 where the lateral force $F_{tZ1}$ acts, and is offset by a distance $l_{b1}$ in the Z direction.

As illustrated in FIG. 2, bending deformation occurs in the strut 10 due to the lateral force $F_{tZ1}$. In the vicinity of ends of the knuckle bracket fastening plates 110a and 110b on the piston rod 102 side, bending moment $M_{tZ1}$ of a cantilever is generated with the vicinity of the end on the piston rod 102 side as a root. The bending moment $M_{tZ1}$ generated at this time is a value obtained by adding bending moment generated by the lateral force $F_{tZ1}$ and bending moment generated by an offset between the lateral force $F_{tZ1}$ and the reaction force $F_{bZ1}$.

In order to improve the bending rigidity of the strut 10 with respect to the bending moment $M_{tZ1}$, it is effective to enlarge an outer shape of the outer tube 104. This is because the second moment of area, which is one of parameters for determining the bending rigidity, can be effectively expanded. For example, in a case where a cross section has a regular circular tube shape, the second moment of area is proportional to the fourth power of a diameter. Meanwhile, it is necessary to provide a clearance, equal to or larger than a distance $l_{c1}$ determined by a vehicle type, between the outer tube 104 and the wheel rim 18 as illustrated in FIG. 3. The distance $l_{c1}$ is the closest position between the outer tube 104 and the wheel rim 18 or the tire 19, and it is necessary to determine the distance $l_{c1}$ such that a tire chain or the wheel does not come into contact with the outer tube 104 when the tire chain is mounted or when the wheel is inched up.

The second moment of area of the outer tube 104 is a value determined by the entire cross-sectional shape. Therefore, in the present embodiment, when a point on the stroke center line 71 in the orthogonal cross section is defined as the stroke center point 71a, a distance from the stroke center point 71a in the virtual region I 192 to a radially outer surface of the outer tube 104 is defined as a distance $l_{i11}$, and a distance from the stroke center point 71a in the virtual region II 193 to the radially outer surface of the outer tube 104, which is at a point-symmetrical position with the distance $l_{i11}$ with the stroke center point 71a as a reference, is defined as a distance $l_{o11}$, the distance $l_{i11}$ is made longer than the distance $l_{o11}$ (distance $l_{i11}$>distance $l_{o11}$).

In addition, the distance $l_{o11}$ to the radially outer surface of the outer tube 104 in the virtual region II 193 on the Z axis, which is a clearance, is set to a value equal to or shorter than the distance $l_{c1}$ (distance $l_{o11}$≤distance $l_{c1}$). In the present embodiment, such a distance relationship is adopted to perform enlargement of an outer shape of the outer tube 104 in the virtual region I 192 having a relatively small restriction on the outer shape while suppressing the enlargement of an outer shape of the outer tube 104 in the virtual region II 193 on the vehicle inside.

Further, when a distance from the stroke center point 71a in the virtual region I 192 to a radially inner surface of the outer tube 104 is defined as a distance $l_{i21}$, and a distance from the stroke center point 71a to the radially inner surface of the outer tube 104, which is at a point-symmetrical position with respect to the distance $l_{i21}$ with the stroke center point 71a in the virtual region II 193 as a reference, is defined as a distance $l_{o21}$, the distance $l_{i21}$ and the distance $l_{o21}$ are set to the same distance (length) (distance $l_{i21}$=distance $l_{o21}$). That is, a thickness $t_{i1}$ of the outer tube 104 in the virtual region I 192 on an arbitrary axis in the radial direction passing through the stroke center point 71a is made thicker than a thickness $t_{o1}$ of the outer tube 104 in the virtual region II 193 (thickness $t_{i1}$>thickness $t_{o1}$). In other words, the thickness of the outer tube 104 on the distance $l_{i11}$ is made thicker than the thickness of the outer tube 104 on the distance $l_{o11}$.

With the above relationship, the cross-sectional area $A_{i1}$ of the outer tube 104 in the virtual region I 192 is larger than the cross-sectional area $A_{o1}$ of the outer tube 104 in the virtual region II 193, it is possible to improve the bending rigidity by securing the necessary second moment of area and to secure the clearance equal to or larger than the distance $l_{c1}$ at which the outer tube 104 does not interfere with the wheel rim 18 or the tire 19 in the present embodiment.

Note that the magnitude relationship between the cross-sectional area $A_{i1}$ of the outer tube 104 in the virtual region I 192 and the cross-sectional area $A_{o1}$ of the outer tube 104 in the virtual region II 193 can also be defined such that the second moment of area $I_{i1}$ of the outer tube 104 in the virtual region I 192 is larger than the second moment of area $I_{o1}$ of the outer tube 104 in the virtual region II 193 (second moment of area $I_{i1}$>second moment of area $I_{o1}$).

In other words, in the orthogonal cross section at the arbitrary axial position on the stroke center line 71 (central axis) of the piston rod 102 (rod) of the outer tube 104, the second moment of area of the outer tube 104 is divided into one side in the radial direction and the other side in the radial direction with respect to the stroke center line 71 (central axis), and second moment of area $I_{o1}$ on the one side in the radial direction of the outer tube 104 is made smaller than the second moment of area $I_{i1}$ on the other side in the radial direction.

Note that the relationship between the cross-sectional area $A_{i1}$ and the cross-sectional area $A_{o1}$ and the relationship between the second moment of area $I_{i1}$ and the second moment of area $I_{o1}$ are an arbitrary axial position of the outer tube 104 provided between the spring seat 107 and the knuckle bracket fastening plate 110a or 110b (knuckle attachment portion), and this arbitrary axial position includes the closest position (distance $l_{c1}$) between the outer tube 104 and the wheel rim 18 or the tire 19.

In the present embodiment, the bending rigidity can be secured if the relationship between the cross-sectional area of the outer tube 104 in the virtual region I 192 and the cross-sectional area of the outer tube 104 in the virtual region II 193 or the relationship regarding the second moment of area is satisfied, and thus, does not exclude that all or some of the above-described relationships of the distance to the radially outer surface with respect to the outer tube 104 on the arbitrary axis in the radial direction passing through the stroke center point 71a, the distance to the radially inner surface, and the thickness are not satisfied.

Further, a cross-sectional shape of the inner tube 103 is preferably a shape close to a regular circular tube. This is because the inner tube 103 serves as the cylinder, and the piston 111 slides linearly on an inner surface of the inner tube 103. This is because it is necessary to make the inner tube 103 and the piston 111 in close contact with each other to allow a damping medium, such as oil, to flow through the piston orifice 111a, and airtightness is required. However, the present invention does not exclude that the cross-sectional shape of the inner tube 103 is any shape such as an ellipse and a polygon.

The above-described relationships regarding the cross-sectional area, the second moment of area, the distance, and the thickness of the outer tube 104 are preferably established at least in the range in the Y direction facing the wheel rim 18 and the tire 19 illustrated in FIG. 2. However, the present invention does not exclude that the above-described relationships are established in only a part of the above-described range or are established in the entire region of the outer tube 104 in the Y direction and a part in the Y direction that does not face the wheel rim 18 and the tire 19.

Figure 4:
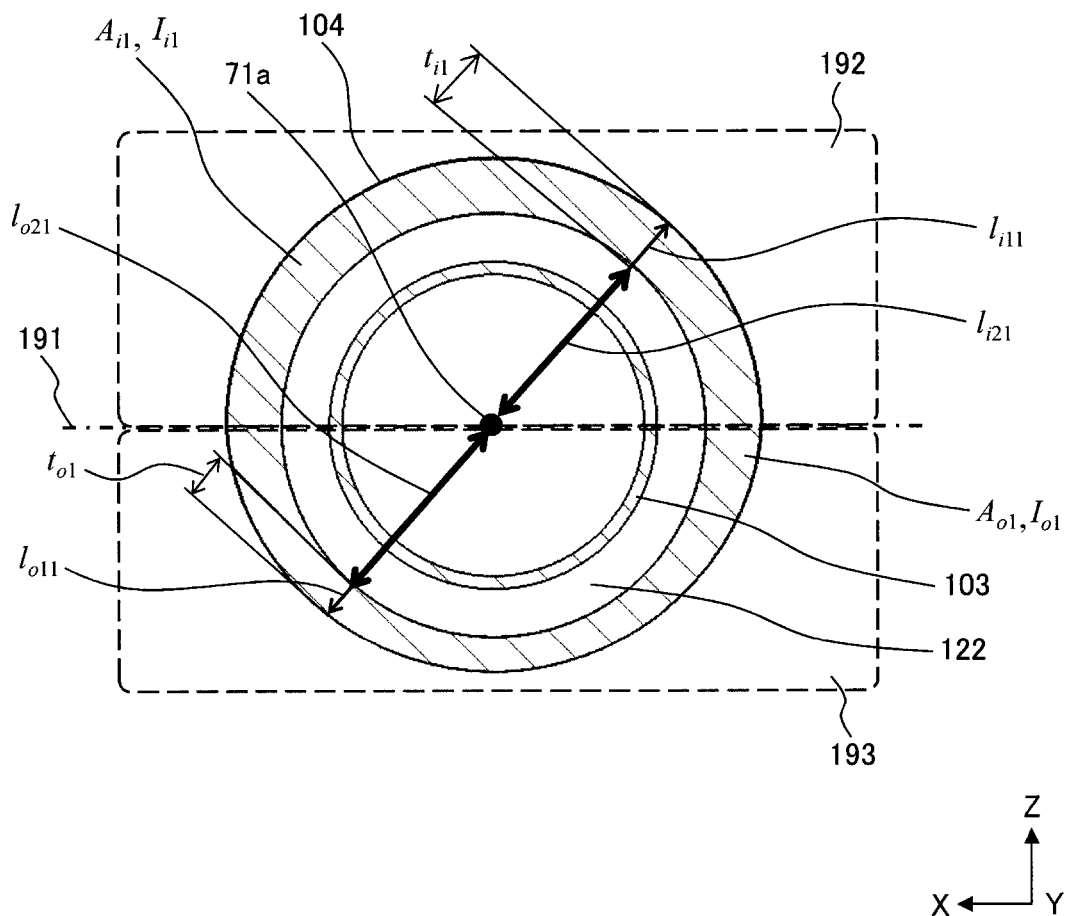
FIG. 4 is a view illustrating a first modification of a cross-sectional shape in FIG. 3.

Next, modifications of the cross-sectional shape of the outer tube 104 illustrated in FIG. 3 will be described with reference to FIGS. 4 to 9. FIG. 4 is a view illustrating a first modification of the cross-sectional shape in FIG. 3. The same components as those in FIG. 3 are denoted by the same reference signs, and the detailed description thereof will be omitted.

A cross-sectional shape of an outer tube 204 illustrated in FIG. 4 is a shape obtained by removing the stabilizer bracket 106 from the cross-sectional shape of the outer tube 104 illustrated in FIG. 3. A cross section of the outer tube 204 has a shape close to an ellipse, and has a shape satisfying all of the relationships regarding the cross-sectional area, the second moment of area, the distance, and the thickness described in FIG. 3.

Figure 5:
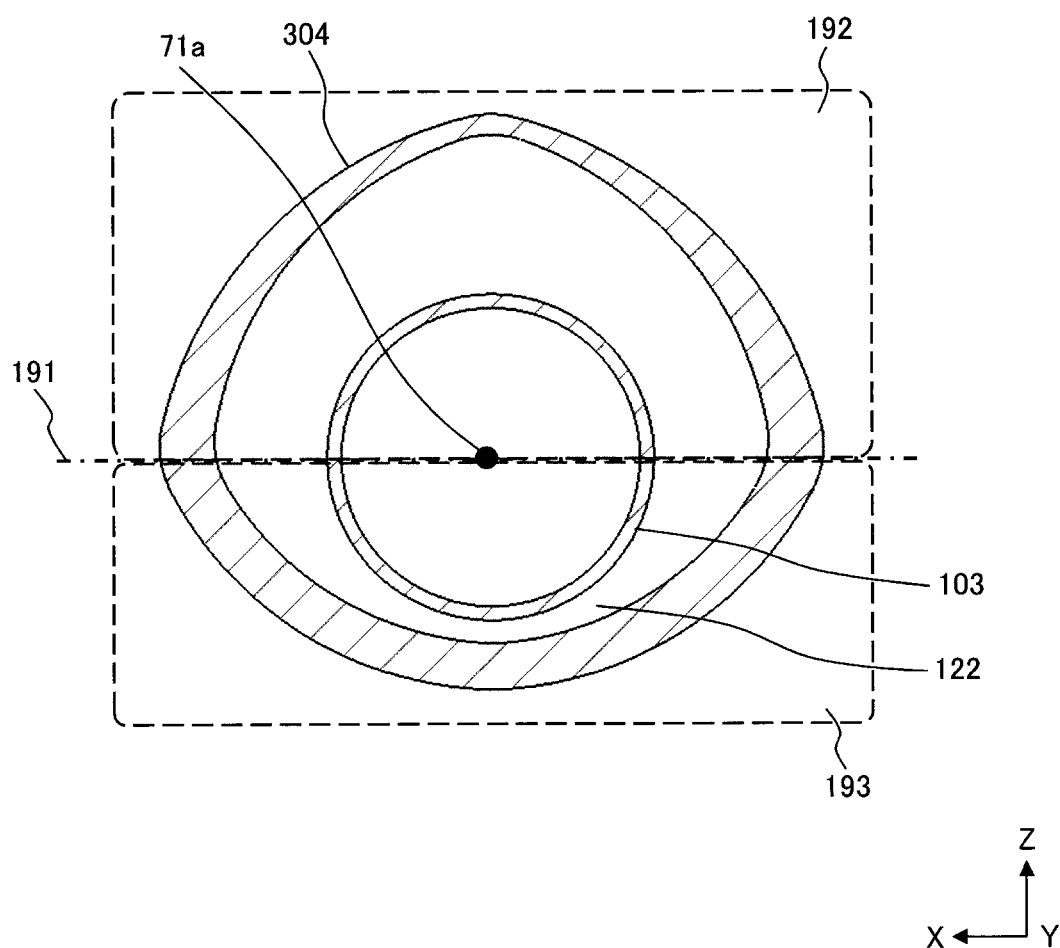
FIG. 5 is a view illustrating a second modification of the cross-sectional shape in FIG. 3.

Next, a second modification will be described with reference to FIG. 5. FIG. 5 is a view illustrating the second modification of the cross-sectional shape in FIG. 3. A cross section of an outer tube 304 illustrated in FIG. 5 has a shape close to an egg-shaped circle. A configuration of FIG. 5 provides the cross-sectional shape that does not satisfy the relationship regarding the cross-sectional area and the relationships regarding the distance and thickness in some regions described in FIG. 3, but satisfies the above-described relationship regarding the second moment of area and can exert effects in FIG. 3. The outer tube 304 is arranged close to the +Z direction which is the vehicle inside, and a cross-sectional area in the virtual region I 192 is larger than a cross-sectional area in the virtual region II 193. With such a configuration, it is possible to improve bending rigidity by expansion of the outer shape of the outer tube while securing a clearance between the wheel rim 18 or the tire 19 and the outer tube 304.

Figure 6:
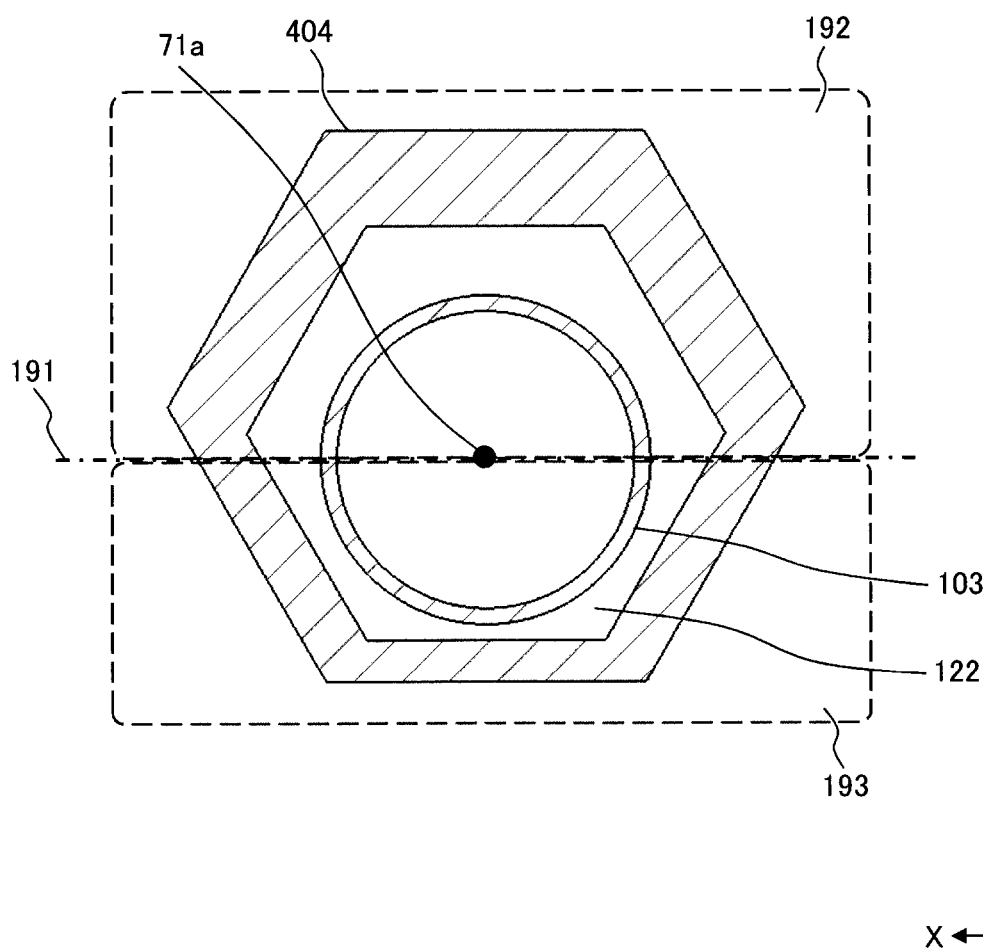
FIG. 6 is a view illustrating a third modification of the cross-sectional shape in FIG. 3.

Next, a third modification will be described with reference to FIG. 6. FIG. 6 is a view illustrating the third modification of the cross-sectional shape in FIG. 3. A cross section of an outer tube 404 illustrated in FIG. 6 has a shape close to a hexagon, and has a shape satisfying all of the relationships regarding the cross-sectional area, the second moment of area, the distance, and the thickness described in FIG. 3. The outer tube 404 is arranged close to the +Z direction which is the vehicle inside, and a cross-sectional area in the virtual region I 192 is larger than a cross-sectional area in the virtual region II 193. With such a configuration, it is possible to improve bending rigidity by expansion of the outer shape of the outer tube while securing a clearance between the wheel rim 18 or the tire 19 and the outer tube 404.

Figure 7:
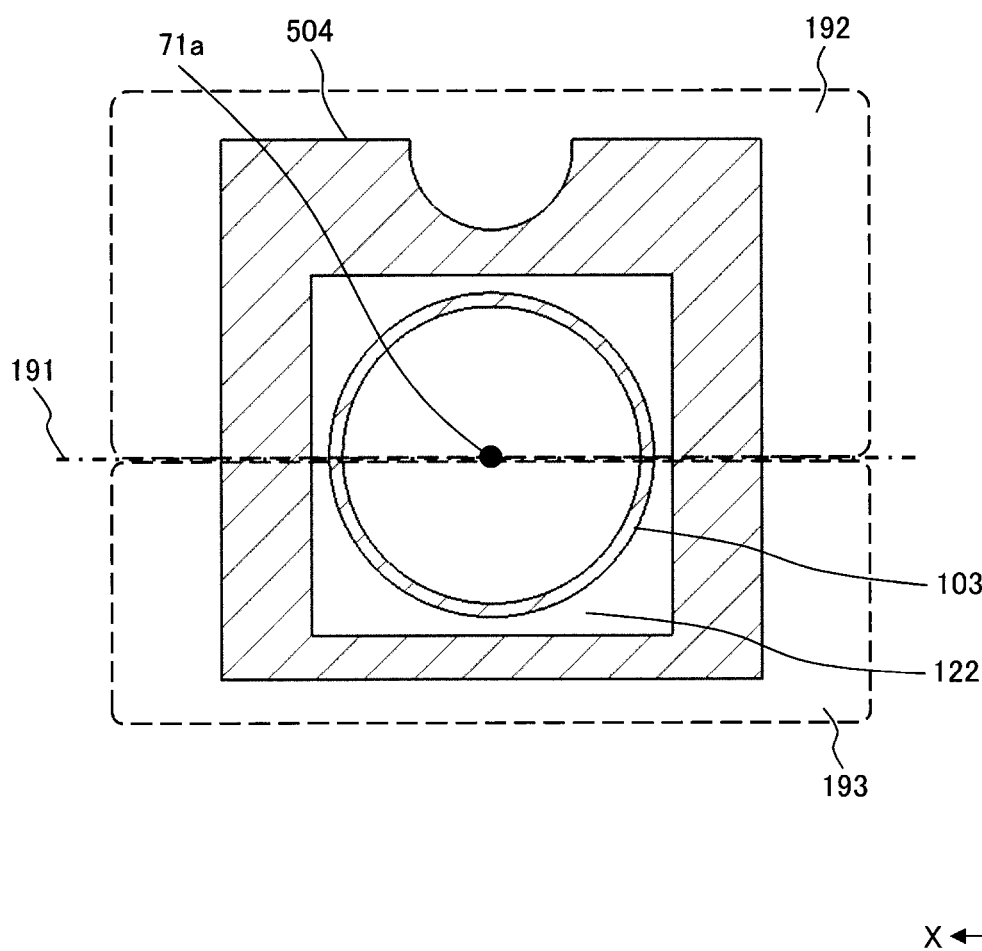
FIG. 7 is a view illustrating a fourth modification of the cross-sectional shape in FIG. 3.

Next, a fourth modification will be described with reference to FIG. 7. FIG. 7 is a view illustrating the fourth modification of the cross-sectional shape in FIG. 3. A cross section of an outer tube 504 illustrated in FIG. 7 has a partial shape close to a quadrangle and has a shape having a radial recess in a virtual region I 592. The above-described relationships regarding the distance and the thickness are not satisfied in such a recessed portion, but the relationships regarding the cross-sectional area and the second moment of area are satisfied in this shape. The outer tube 504 is arranged close to the +Z direction which is the vehicle inside, and a cross-sectional area in the virtual region I 192 is larger than a cross-sectional area in the virtual region II 193. With such a configuration, it is possible to improve bending rigidity by expansion of the outer shape of the outer tube while securing a clearance between the wheel rim 18 or the tire 19 and the outer tube 504.

Figure 8:
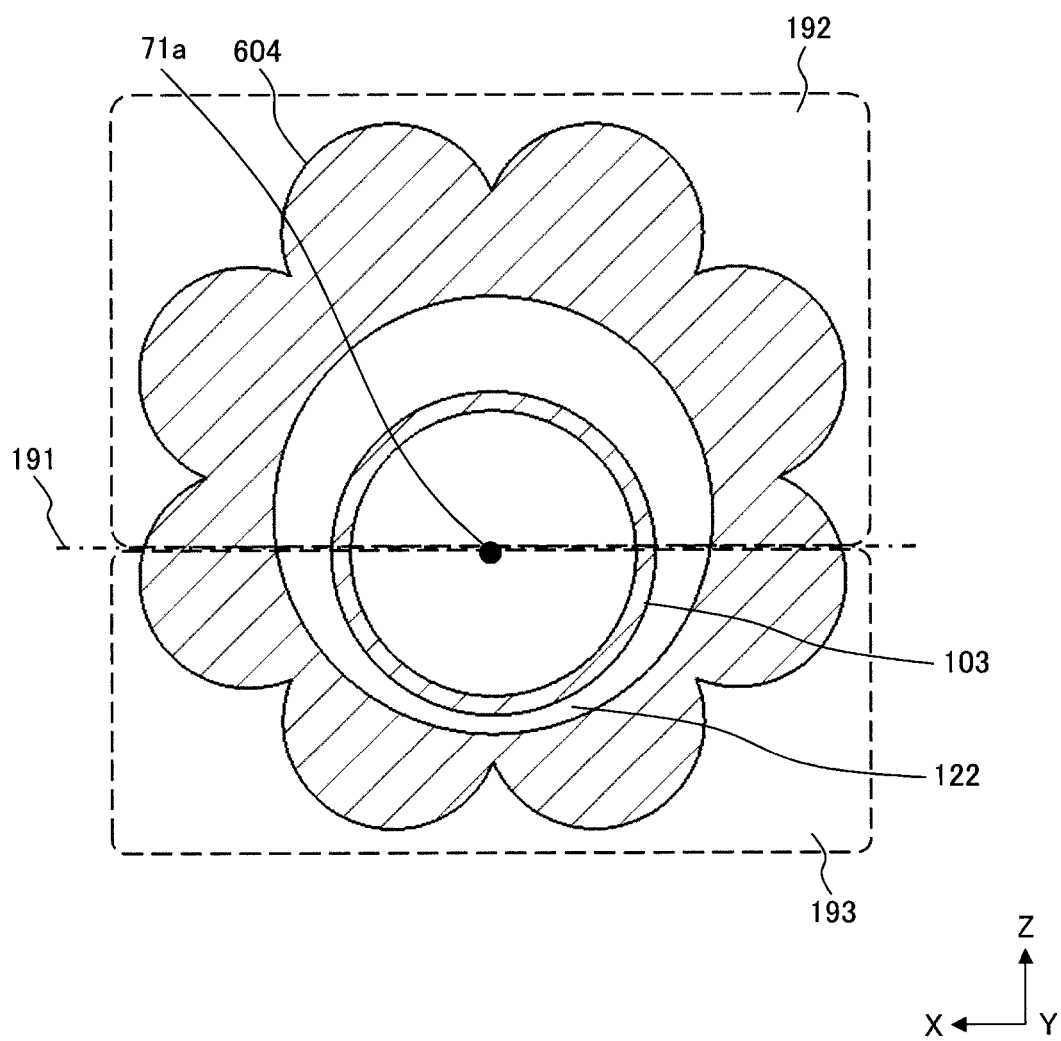
FIG. 8 is a view illustrating a fifth modification of the cross-sectional shape in FIG. 3.

Next, a fifth modification will be described with reference to FIG. 8. FIG. 8 is a view illustrating the fifth modification of the cross-sectional shape in FIG. 3. A cross section of an outer tube 604 illustrated in FIG. 8 has a shape close to a petal, and has a shape satisfying all of the above-described relationships regarding the cross-sectional area, the second moment of area, the distance, and the thickness. The outer tube 604 is arranged close to the +Z direction which is the vehicle inside, and a cross-sectional area in the virtual region I 192 is larger than a cross-sectional area in the virtual region II 193. With such a configuration, it is possible to improve bending rigidity by expansion of the outer shape of the outer tube while securing a clearance between the wheel rim 18 or the tire 19 and the outer tube 604.

Figure 9:
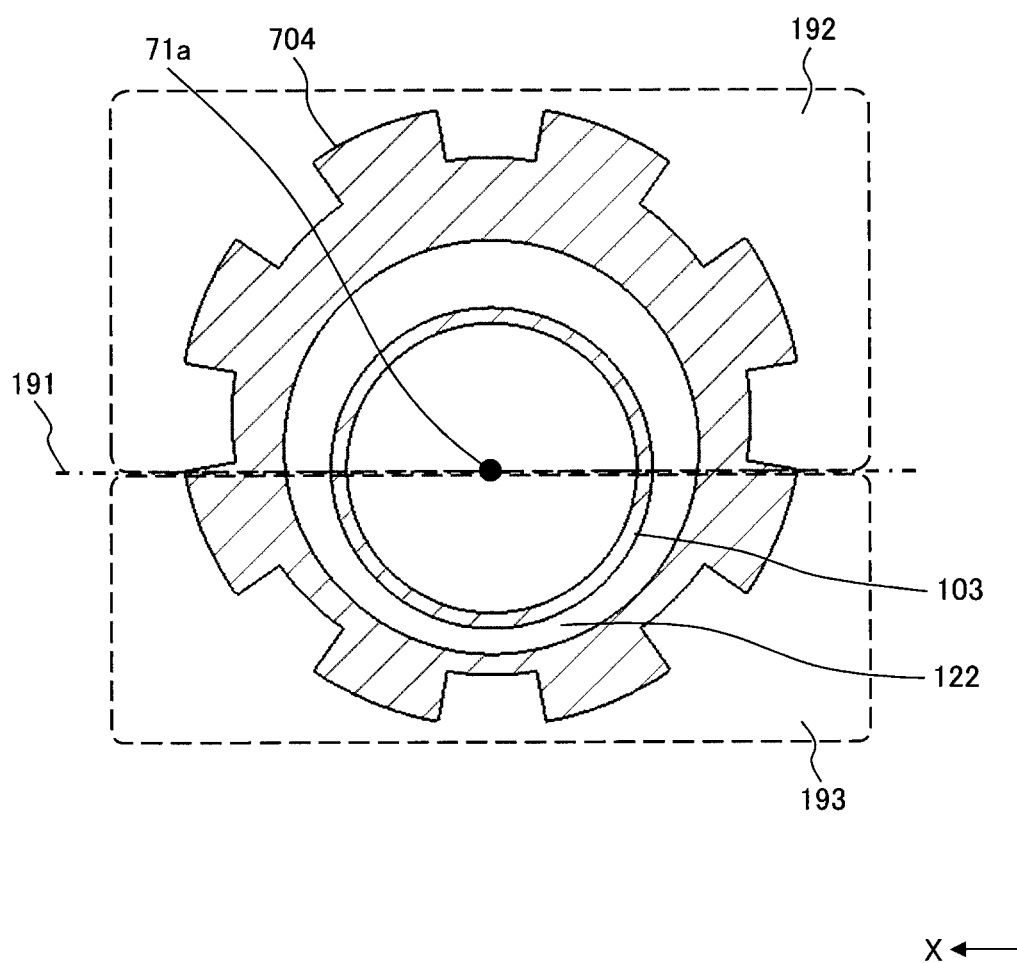
FIG. 9 is a view illustrating a sixth modification of the cross-sectional shape in FIG. 3.

Next, a sixth modification will be described with reference to FIG. 9. FIG. 9 is a view illustrating the sixth modification of the cross-sectional shape in FIG. 3. A cross section of an outer tube 704 illustrated in FIG. 9 has a shape close to a gear, and has a shape satisfying all of the above-described relationships regarding the cross-sectional area, the second moment of area, the distance, and the thickness. The outer tube 704 is arranged close to the +Z direction which is the vehicle inside, and a cross-sectional area in the virtual region I 192 is larger than a cross-sectional area in the virtual region II 193. With such a configuration, it is possible to improve bending rigidity by expansion of the outer shape of the outer tube while securing a clearance between the wheel rim 18 or the tire 19 and the outer tube 704.

Second Embodiment

Figure 10:
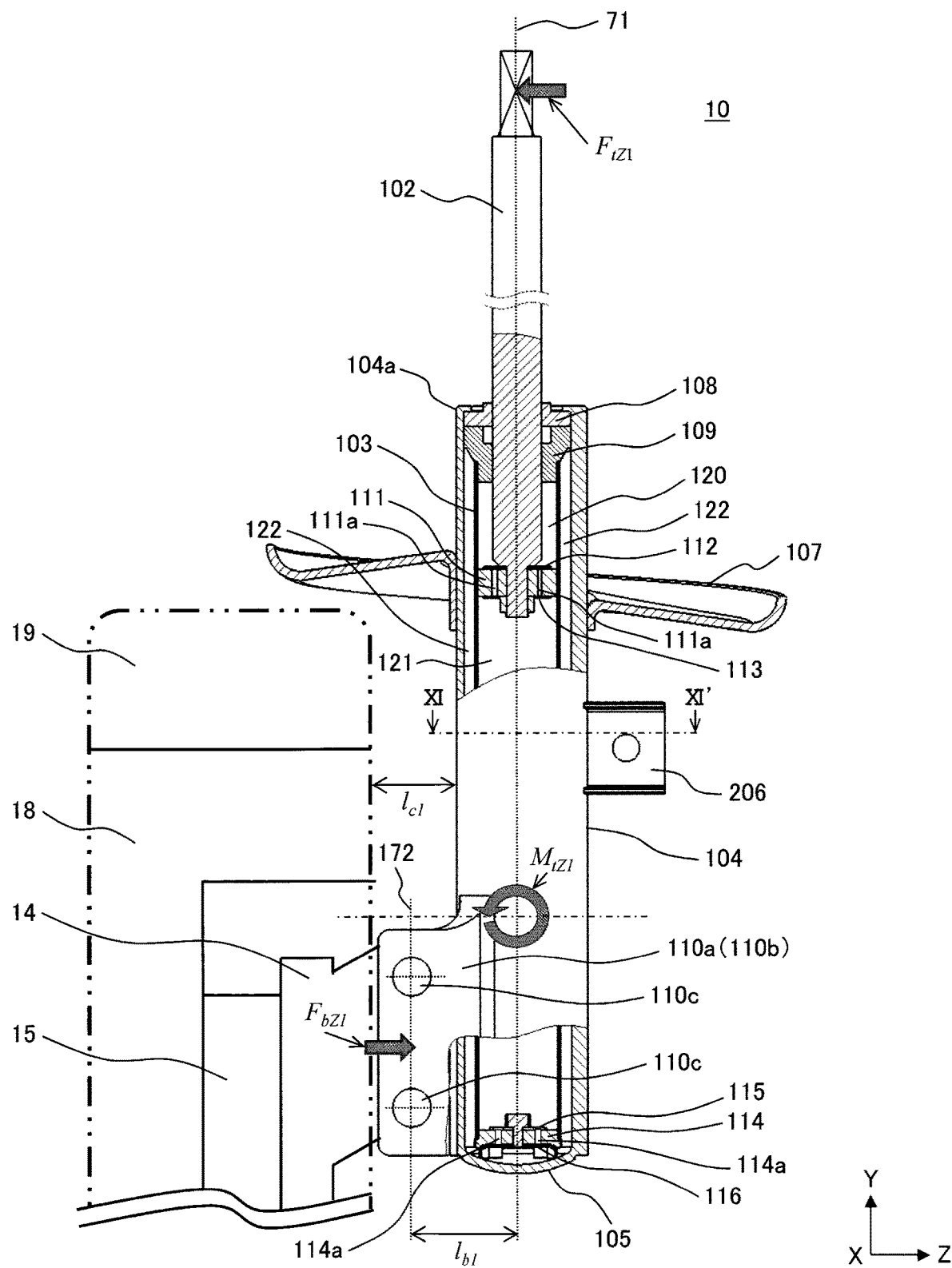
FIG. 10 is a longitudinal side view of a dual-tube-type strut shock absorber as viewed from a front direction of a vehicle body according to a second embodiment of the present invention.
Figure 11:
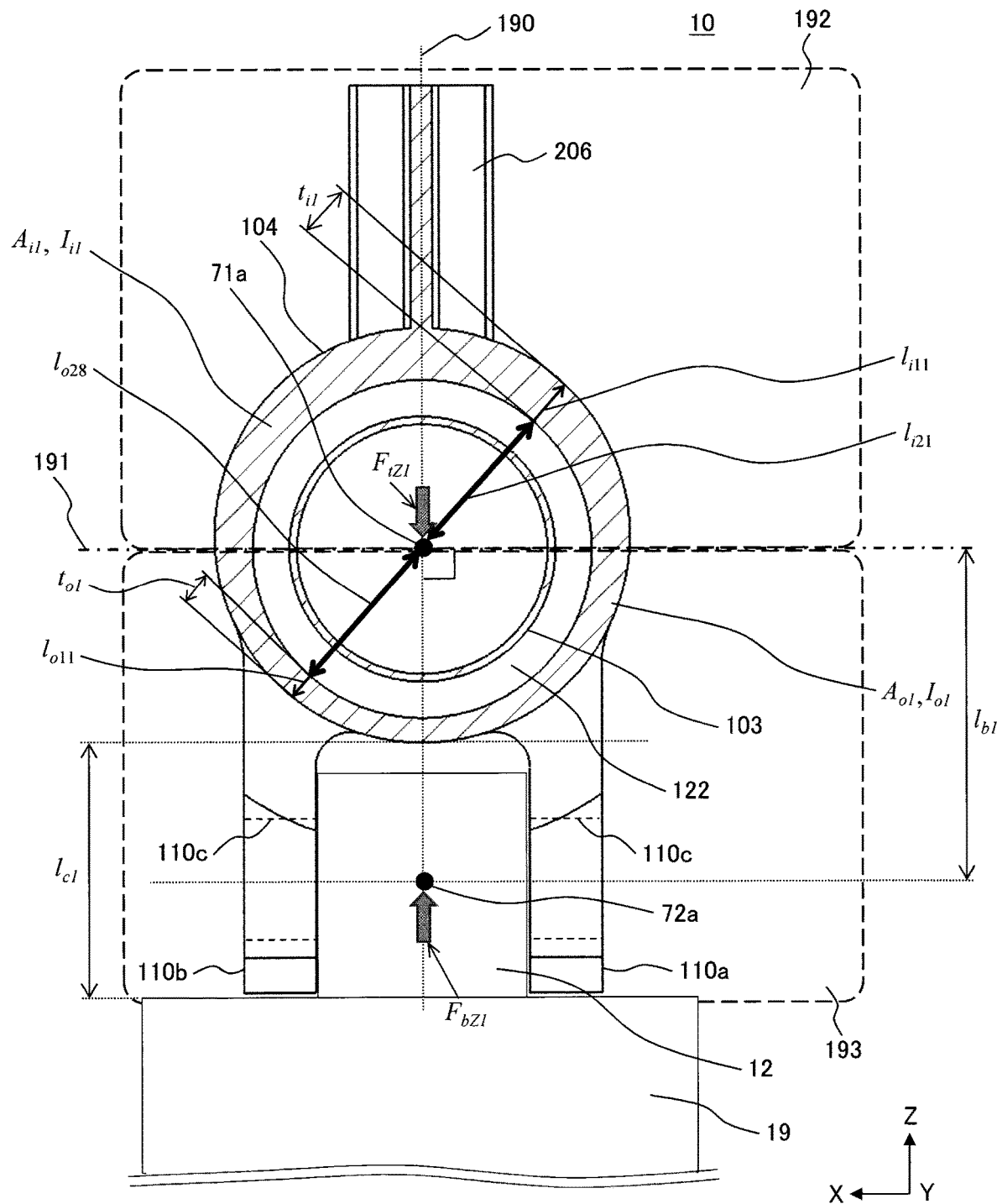
FIG. 11 is a cross-sectional view taken along line XI-XI' of FIG. 10.

Next, a second embodiment of the present invention will be described with reference to FIGS. 10 and 11. FIG. 10 is a longitudinal side view of a dual-tube-type strut shock absorber as viewed from a front direction of a vehicle body according to the second embodiment of the present invention, and FIG. 11 is a cross-sectional view taken along line XI-XI' of FIG. 10. The same components as those in the first embodiment are denoted by the same reference signs, and the detailed description thereof will be omitted.

The second embodiment is different from the first embodiment in that a stabilizer bracket 206 attached to the strut 10 is arranged in the +Z direction which is the vehicle inside. That is, the stabilizer bracket 206, provided in an outer tube, is provided on the opposite side of the knuckle bracket fastening plates 110a and 110b (knuckle attachment portions) with the outer tube 104 interposed therebetween.

As illustrated in FIG. 11, the stabilizer bracket 206 is arranged on a lateral force reaction force acting line 190 generated by action of the lateral force $F_{tZ1}$ and the reaction force $F_{bZ1}$ and on a radially outer surface of the outer tube 104 in the virtual region I 192 in the second embodiment. With such an arrangement, a cross-sectional area and the second moment of area of the outer tube 104 in the virtual region I 192 can be improved, and bending rigidity of the strut 10 with respect to the lateral force $F_{rZ1}$ can be improved. As illustrated in FIG. 11, the stabilizer bracket 206 is preferably arranged such that a center position in the X direction matches with the lateral force reaction force acting line 190 since the second moment of area can be maximized. However, even when the center position of the stabilizer bracket 206 in the X direction does not matches with the lateral force reaction force acting line 190, the bending rigidity can be improved as long as the stabilizer bracket 206 is arranged in the virtual region I 192. As illustrated in FIG. 10, the stabilizer bracket 206 is preferably arranged in a range facing the wheel rim 18 and the tire 19. In this case, the stabilizer bracket 206 is preferably arranged in the entire region or a partial region with a length in the Y direction facing the wheel rim 18 and the tire 19. Note that the present invention does not exclude that the stabilizer bracket 206 is arranged at a position in the Y direction not facing the wheel rim 18 and the tire 19.

In the strut 10 illustrated in FIG. 2, the stabilizer bracket 106 is arranged on the front side of the vehicle. Since the knuckle bracket fastening plate 110a and the knuckle bracket fastening plate 110b are generally arranged on the vehicle outside, it is necessary to manufacture struts having different specifications for left and right wheels at an arrangement position of the stabilizer bracket 106 in the strut 10.

On the other hand, the strut 10 can be shared by the right and left wheels by arranging the stabilizer bracket 206 in the range facing the wheel rim 18 and the tire 19 in the second embodiment, so that the cost of the strut 10 can be reduced.

In the first embodiment and the second embodiment described above, an aluminum alloy material is applied as a constituent material of the outer tube 104. In the first embodiment and the second embodiment, the weight of the strut 10 can be reduced by applying a low-density aluminum alloy material to a steel material for the improvement of the second moment of area due to the expansion of the outer shape of the outer tube 104. Note that any composite material such as a steel material, a magnesium alloy material, a titanium alloy material, a resin material, a carbon-based composite material, and a glass-based composite material may be used as the constituent material. However, it is preferable to form the inner tube 103, the outer tube 104, the stabilizer bracket 106, the spring seat 107, and the knuckle bracket fastening plates 110a and 110b using the same kind of material in order to obtain the same linear expansion coefficient and the same thermal deformation amount with respect to thermal deformation caused by a change of an environmental temperature or heat generation of the liquid during the stroke. Note that the present invention does not exclude that the inner tube 103, the outer tube 104, the stabilizer bracket 106, the spring seat 107, the knuckle bracket fastening plate 110a, and the knuckle bracket fastening plate 110b are made of different materials. Further, the inner tube 103, the outer tube 104, the stabilizer bracket 106, the spring seat 107, the knuckle bracket fastening plate 110a, and the knuckle bracket fastening plate 110b may be subjected to surface treatment or heat treatment such as plating, painting, alumite, or carburization for the purpose of rust prevention or improvement in surface hardness. The same applies to the modifications illustrated in FIGS. 4 to 11.

As a method for manufacturing the outer tube 104, gravity casting or die casting is preferable as a method for molding a shape having an uneven thickness in the circumferential direction. The outer tube 104 may be obtained by molding a member, which has been previously thickened by different material joining using a tailored blank method or a flow forming method, into a tubular shape by an electric resistance welding method. Furthermore, the outer tube 104 may be molded by three-dimensional molding. Note that the present invention does not exclude molding by cutting, forging, extrusion, drawing, or the like.

The stabilizer bracket 106, the knuckle bracket fastening plate 110a, and the knuckle bracket fastening plate 110b molded in the outer tube 104 are preferably integrally cast-molded to reduce the number of components. Note that the spring seat 107 is provided as a separate component and is fixed by welding in the first and second embodiments, but may be fixed by any method such as fitting, press-fitting, brazing, adhesion, bolt fastening, caulking, and injection molding. Further, the spring seat 107 may be molded by integral casting.

The stabilizer bracket 106 and the knuckle bracket fastening plates 110a and 110b are integrally cast-molded, but may be fixed by any method such as welding, fitting, press-fitting, brazing, adhesion, bolt fastening, caulking, and injection molding, as separate parts.

The stabilizer bracket 106 and the spring seat 107 may be integrated, or the knuckle bracket fastening plate 110a and the knuckle bracket fastening plate 110b may be integrated.

Further, the knuckle bracket fastening plates 110a and 110b may be removed from the outer tube 104, and the outer tube 104 may be directly fixed to the knuckle 14 by a method such as welding, fitting, press-fitting, brazing, adhesion, bolt fastening, caulking, and injection molding, at the time of fixing the strut 10. In this case, a certain mark, such as a protrusion, a recess, and an engraved mark, may be molded on the strut 10 or the outer surface of the outer tube 104 such that a vehicle attachment position of the outer tube 104 can be visually determined. The same applies to the modifications illustrated in FIGS. 4 to 11.

The present invention is not limited to those described in the first and second examples, and may be a controlled dual-tube-type strut shock absorber and a shock absorber of a type in which damping performance is switched by switching a plurality of pistons by an actuator with respect to a road surface input frequency or a type in which damping performance is switched by some external energy of a solenoid or the like stored in or attached to an outer tube.

Further, the present invention may be a dual-tube-type strut shock absorber and a shock absorber using air, a magneto-rheological fluid, an electro-rheological fluid, or the like as a medium that exerts a damping force. Furthermore, the present invention may be a single-tube-type strut shock absorber or an inverted single-tube-type or dual-tube-type strut shock absorber for fastening a rod to a knuckle side, and a shock absorber.

Example of Embodiment of Present Invention

As an example of an embodiment of the present invention, provided is a strut shock absorber, for example, including: a piston 111; a buffer mechanism having a piston rod 102 connected to the piston 111; a tubular inner tube 103 housing the buffer mechanism; and an outer tube 104 housing the inner tube 103. The outer tube 104 has a pair of knuckle bracket fastening plates 110a and 110b provided integrally with the outer tube 104 and protruding toward one direction from an outer surface of the outer tube 104. The pair of knuckle bracket fastening plates 110a and 110b have wide surfaces facing each other, the wide surfaces being provided along an axial direction of the outer tube 104. When the inside of a vehicle is defined as a virtual region I 192 and the outside of the vehicle is defined as a virtual region II 193 with a virtual line 191, which passes through a stroke center line 71 and matches the inside and the outside of the vehicle, as a boundary in an orthogonal cross section at an arbitrary axial position of the outer tube 104 orthogonal to the stroke center line 71 of the piston rod 102, a cross-sectional area $A_{i1}$ of the outer tube 104 in the virtual region I 192 is made larger than a cross-sectional area $A_{o1}$ of the outer tube 104 in the virtual region II 193.

According to the present embodiment, it is possible to provide a dual-tube-type strut shock absorber capable of achieving both improvement of bending rigidity by expansion of a diameter of the outer tube with respect to a lateral force and improvement of steering stability and ride comfort of the vehicle while securing a clearance between a wheel rim or a tire and the outer tube.

Incidentally, the present invention is not limited to the respective embodiments described above, and includes various modifications. For example, the above-described embodiments have been described in detail in order to describe the present invention in an easily understandable manner, and are not necessarily limited to one including the entire configuration that has been described above. Further, a part of the configuration of a certain embodiment can be replaced with the configuration of another embodiment, and the configuration of another embodiment can be added to the configuration of a certain embodiment. Further, addition, deletion or substitution of other configurations can be made with respect to some configurations of each embodiment.

REFERENCE SIGNS LIST

1 McPherson strut suspension device for automobile
10 strut
11 vehicle body
12 upper mount
13 coil spring
14 knuckle
15 wheel hub
16 stabilizer
17 lower arm
18 wheel rim
19 tire
20 ground
71 stroke center line
71a stroke center point
72a knuckle fastening center point
102 piston rod
103 inner tube
104 outer tube
104a outer tube distal end plate
105 outer tube bottom plate
106 stabilizer bracket
107 spring seat
108 oil seal
109 rod guide
110a, 110b knuckle bracket fastening plate
110c bolt fastening hole
111 piston
111a piston orifice
112 piston check valve
113 extension-side damping valve
114 bottom valve
114a bottom valve orifice
115 bottom valve check valve
116 contraction-side damping valve
120 upper chamber
121 lower chamber
122 reservoir chamber
190 lateral force reaction force acting line
191 virtual line
192 virtual region I
193 virtual region II

The invention claimed is:

1. A cylinder device comprising:
a piston;
a buffer mechanism having a piston rod connected to the piston;
a tubular inner tube housing the buffer mechanism; and
an outer tube housing the inner tube,
wherein the outer tube has a pair of knuckle attachment portions provided integrally with the outer tube and protruding toward one direction from an outer surface of the outer tube,
the pair of knuckle attachment portions have wide surfaces facing each other, the wide surfaces being provided along an axial direction of the outer tube,
when an inside of a vehicle is defined as a virtual region I and an outside of the vehicle is defined as a virtual region II with a virtual line, which passes through a stroke center line and matches the inside and the outside of the vehicle, as a boundary in an orthogonal cross section at any axial position of the outer tube (i) along the stroke center line of the piston rod and (ii) orthogonal to the stroke center line of the piston rod, a cross-sectional area of the outer tube in the virtual region I is larger than a cross-sectional area of the outer tube in the virtual region II, and a thickness of the outer tube in the virtual region I is thicker than a thickness of the outer tube in the virtual region II,
a point on the stroke center line in the orthogonal cross section is defined as a stroke center point, and
when a distance from the stroke center point in the virtual region I to any position along a radially outer surface of the outer tube is defined as a distance $l_{i11}$, and a distance from the stroke center point in the virtual region II to any position along a radially outer surface of the outer tube, which is at a point-symmetrical position with respect to the distance $l_{i11}$ with the stroke center point as a reference, is defined as a distance $l_{o11}$, the distance $l_{i11}$ is longer than the distance $l_{o11}$ at any axial position of the outer tube.

2. The cylinder device according to claim 1, wherein
a tire is fixed to an outer peripheral portion of a wheel rim to form a wheel, and
the axial position of the outer tube includes a closest position of the wheel with respect to the tire or the wheel rim.

3. The cylinder device according to claim 1, wherein
a tire is fixed to an outer peripheral portion of a wheel rim to form a wheel, and
the virtual line is a line orthogonal to a rotation axis of the wheel.

4. The cylinder device according to claim 1, wherein
a thickness of the outer tube on the distance $l_{i11}$ is thicker than a thickness of the outer tube on the distance $l_{o11}$.

5. The cylinder device according to claim 1, wherein
the outer tube is provided with a spring seat that supports a coil spring, and the axial position is provided between the knuckle attachment portion and the spring seat.

6. The cylinder device according to claim 1, wherein
an opening center on one end side of the outer tube is coaxial with the stroke center line.

7. The cylinder device according to claim 1, wherein
the outer tube includes a stabilizer bracket, and
the stabilizer bracket is provided on an opposite side of the knuckle attachment portion with the outer tube interposed between the stabilizer bracket and the knuckle attachment portion.

8. A cylinder device comprising:
a tubular outer tube; and
a rod that protrudes from one end of the outer tube and strokes,
wherein one side in a radial direction and another side in the radial direction with respect to the central axis are divided in an orthogonal cross section at any axial position of the outer tube along a central axis of the rod, a cross-sectional area of the outer tube on the one side in the radial direction is smaller than a cross-sectional area of the outer tube on the other side in the radial direction, and a thickness of the outer tube on the one side in the radial direction is thinner than a thickness of the outer tube on the other side in the radial direction,
a point on the central axis in the orthogonal cross section is defined as a stroke center point, and
when a distance from the stroke center point on the one side in the radial direction to any position along a radially outer surface of the outer tube is defined as a distance $l_{i11}$, and a distance from the stroke center point on the other side in the radial direction to any position along a radially outer surface of the outer tube, which is at a point-symmetrical position with respect to the distance $l_{i11}$ with the stroke center point as a reference, is defined as a distance $l_{o11}$, the distance $l_{i11}$ is longer than the distance $l_{o11}$ at any axial position of the outer tube.

9. The cylinder device according to claim 8, wherein
the axial position of the outer tube on the central axis of the rod includes a closest position to a tire or a wheel rim forming a wheel.

10. The cylinder device according to claim 9, wherein
a boundary between the one side in the radial direction and the other side in the radial direction with respect to the central axis is a surface orthogonal to a rotation axis of the wheel.

11. The cylinder device according to claim 10, wherein
a maximum distance of a perpendicular line from a boundary surface between the one side in the radial direction and the other side in the radial direction with respect to an outer periphery of the outer tube in the orthogonal cross section at the axial position on the central axis is shorter on the one side in the radial direction.

12. The cylinder device according to claim 9, wherein
the outer tube has a pair of knuckle attachment portions provided integrally with the outer tube and protruding toward one direction from an outer surface of the outer tube,
the outer tube is provided with a spring seat that receives a spring, which supports a vehicle body on which the cylinder device is provided, and
the axial position is provided between the knuckle attachment portion and the spring seat.

13. The cylinder device according to claim 8, wherein
the outer tube is made of a gravity casting.

14. The cylinder device according to claim 8, wherein
an opening on one end side of the outer tube is coaxial with a central axis of the rod in a stroke direction.

15. A cylinder device comprising:
a piston;
a buffer mechanism having a piston rod connected to the piston;
a tubular inner tube housing the buffer mechanism; and
an outer tube housing the inner tube,
wherein the outer tube has a pair of knuckle attachment portions provided integrally with the outer tube and protruding toward one direction from an outer surface of the outer tube,
the pair of knuckle attachment portions have wide surfaces facing each other, the wide surfaces being provided along an axial direction of the outer tube,
when an inside of a vehicle is defined as a virtual region I and an outside of the vehicle is defined as a virtual region II with a virtual line, which passes through a stroke center line and matches the inside and the outside of the vehicle, as a boundary in an orthogonal cross section at any axial position of the outer tube (i) along the stroke center line of the piston rod and (ii) orthogonal to the stroke center line of the piston rod, a second moment of area of the outer tube in the virtual region I is larger than a second moment of area of the outer tube in the virtual region II, and a thickness of the outer tube in the virtual region I is thicker than a thickness of the outer tube in the virtual region II,
a point on the stroke center line in the orthogonal cross section is defined as a stroke center point, and
when a distance from the stroke center point in the virtual region I to any position along a radially outer surface of the outer tube is defined as a distance $l_{i11}$, and a distance from the stroke center point in the virtual region II to any position along a radially outer surface of the outer tube, which is at a point-symmetrical position with respect to the distance $l_{i11}$ with the stroke center point as a reference, is defined as a distance $l_{o11}$, the distance $l_{i11}$ is longer than the distance $l_{o11}$ at any axial position of the outer tube.

16. A cylinder device comprising:
a tubular outer tube; and
a rod that protrudes from one end of the outer tube and strokes,
wherein one side in a radial direction and another side in the radial direction with respect to the central axis are divided in an orthogonal cross section at any axial position of the outer tube along a central axis of the rod, a second moment of area of the outer tube on the one side in the radial direction is smaller than a second moment of area of the outer tube on the other side in the radial direction, and a thickness of the outer tube on the one side in the radial direction is thinner than a thickness of the outer tube on the other side in the radial direction,
a point on the central axis in the orthogonal cross section is defined as a stroke center point, and
when a distance from the stroke center point on the one side in the radial direction to any position along a radially outer surface of the outer tube is defined as a distance $l_{i11}$, and a distance from the stroke center point on the other side in the radial direction to any position along a radially outer surface of the outer tube, which is at a point-symmetrical position with respect to the distance $l_{i11}$ with the stroke center point as a reference, is defined as a distance $l_{o11}$, the distance $l_{i11}$ is longer than the distance $l_{o11}$ at any axial position of the outer tube.

* * * * *